United States Patent
Childers et al.

(10) Patent No.: US 11,165,662 B2
(45) Date of Patent: Nov. 2, 2021

(54) ENABLING INTERACTIVE CABLE ROUTING AND PLANNING OPTIMIZATION FOR CUSTOMIZED HARDWARE CONFIGURATIONS

(71) Applicant: International Business Machines Corporation, Armonk, NY (US)

(72) Inventors: Adam Benjamin Childers, Tucson, AZ (US); Ryan Elsasser, Poughkeepsie, NY (US); Karl Owen Casserly, Valley Stream, NY (US); Richard Burton Finch, New Paltz, NY (US); Paul Samaniego, Port Ewen, NY (US); Michael J Doscher, Poughkeepsie, NY (US); Mateusz Koziol, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/364,329

(22) Filed: Mar. 26, 2019

(65) Prior Publication Data
US 2020/0313978 A1 Oct. 1, 2020

(51) Int. Cl.
*H04L 12/04* (2006.01)
*H04L 12/24* (2006.01)
(Continued)

(52) U.S. Cl.
CPC .......... *H04L 41/22* (2013.01); *G06F 3/0482* (2013.01); *G06F 3/0484* (2013.01); *H04L 41/0883* (2013.01); *H04L 41/145* (2013.01)

(58) Field of Classification Search
None
See application file for complete search history.

(56) References Cited

U.S. PATENT DOCUMENTS

| 6,245,599 B1 * | 6/2001 | Goto ................. H01L 23/49816 |
| | | 438/129 |
| 7,206,723 B2 | 4/2007 | Sawai et al. |

(Continued)

FOREIGN PATENT DOCUMENTS

| CN | 107657841 A | 2/2018 |
| WO | 2005/120084 A2 | 12/2005 |
| WO | 2009/109785 A2 | 9/2009 |

OTHER PUBLICATIONS

Mell et al.; "The NIST Definition of Cloud Computing-Recommendations of the National Institute of Standards and Technology"; U.S. Department of Commerce; Sep. 2011; 7 pages.

*Primary Examiner* — Tuan S Nguyen
(74) *Attorney, Agent, or Firm* — Cantor Colburn LLP; Tihon Poltavets

(57) ABSTRACT

Provided are systems, methods, and computer products for interactive cable routing and planning optimization for customized hardware configurations. An example method includes receiving a set of cable characteristics and a set of user selections, in which the set of user selections are received via a graphical user interface (GUI). Identifying possible cabling routes for a hardware configuration based, at least in part, on available plug start and termination locations. Ranking each of the possible cabling routes based, at least in part, on a prioritized list of optimization criteria and the set of cable characteristics. Generating a suggested cabling configuration for one or more applications based, at least in part, on the set of cable characteristics, the set of user selections, and the ranking. Outputting the suggested cabling configuration to the user by at least providing a three-dimensional view of the suggested cabling configuration via the GUI.

20 Claims, 5 Drawing Sheets

(51) Int. Cl.
G06F 3/0484 (2013.01)
G06F 3/0482 (2013.01)

(56) References Cited

U.S. PATENT DOCUMENTS

| | | |
|---|---|---|
| 8,793,351 B2 | 7/2014 | Renzin |
| 9,219,644 B2 | 12/2015 | Renzin |
| 2004/0130878 A1 | 7/2004 | Sawai et al. |
| 2006/0100934 A1* | 5/2006 | Burr .................. G06Q 30/0635 |
| | | 705/26.81 |
| 2007/0219764 A1 | 9/2007 | Backe et al. |
| 2011/0252163 A1 | 10/2011 | Villar et al. |
| 2014/0304336 A1 | 10/2014 | Renzin |
| 2015/0227668 A1* | 8/2015 | Liu ...................... G06F 30/394 |
| | | 716/130 |
| 2016/0267214 A1 | 9/2016 | Lim et al. |
| 2018/0136815 A1 | 5/2018 | Tomizuka et al. |

* cited by examiner

ENABLING INTERACTIVE CABLE ROUTING AND PLANNING OPTIMIZATION FOR CUSTOMIZED HARDWARE CONFIGURATIONS

BACKGROUND

The present invention generally relates to cable routing, and more specifically, to interactive cable routing and planning optimization for customized hardware configurations.

Cabling configurations are becoming increasingly complex as a result of continuous expansion of technology, spacial limits of present datacenter footprints, and growing desire to accommodate new technology within the same physical space. The increase in the number of highly customizable configurations and quantity of equipment that are needed to fit into the limited spacial footprint causes an ever growing number of possible cabling configurations, component placement options, and numerous potential upgrade paths.

SUMMARY

Embodiments of the present invention provide a computer-implemented method for interactive cable configuration routing and/or optimization. A non-limiting example of the computer-implemented method includes receiving, by a system comprising one or more processors, a set of cable characteristics and a set of user selections, in which the set of user selections are received via a graphical user interface (GUI), and in which the set of user selections includes a prioritized list of optimization criteria. The method includes identifying, by the system, possible cabling routes for a hardware configuration based, at least in part, on available plug start and termination locations. The method includes ranking, by the system, each of the possible cabling routes based, at least in part, on the prioritized list of optimization criteria and the set of cable characteristics. The method includes generating, by the system, a suggested cabling configuration for one or more applications based, at least in part, on the set of cable characteristics, the set of user selections, and the ranking, in which the one or more applications includes one or more of a design application, a manufacturing application, or a service application. The method includes outputting, by the system, the suggested cabling configuration to the user by at least providing a three-dimensional view of the suggested cabling configuration via the GUI.

Embodiments of the present invention provide a system for interactive cable configuration routing and/or optimization. A non-limiting example of the system includes one or more processors configured to perform a method. A non-limiting example method includes receiving, by the system, a set of cable characteristics and a set of user selections, in which the set of user selections are received via a GUI, and in which the set of user selections includes a prioritized list of optimization criteria. The method includes identifying, by the system, possible cabling routes for a hardware configuration based, at least in part, on available plug start and termination locations. The method includes ranking, by the system, each of the possible cabling routes based, at least in part, on the prioritized list of optimization criteria and the set of cable characteristics. The method includes generating, by the system, a suggested cabling configuration for one or more applications based, at least in part, on the set of cable characteristics, the set of user selections, and the ranking, in which the one or more applications includes one or more of a design application, a manufacturing application, or a service application. The method includes outputting, by the system, the suggested cabling configuration to the user by at least providing a three-dimensional view of the suggested cabling configuration via the GUI.

Embodiments of the invention provide a computer program product for interactive cable configuration routing and/or optimization, the computer program product comprising a computer readable storage medium having program instructions embodied therewith. The program instructions are executable by a processor to cause the processor to perform a method. A non-limiting example method includes receiving, by the system, a set of cable characteristics and a set of user selections, in which the set of user selections are received via a GUI, and in which the set of user selections includes a prioritized list of optimization criteria. The method includes identifying, by the system, possible cabling routes for a hardware configuration based, at least in part, on available plug start and termination locations. The method includes ranking, by the system, each of the possible cabling routes based, at least in part, on the prioritized list of optimization criteria and the set of cable characteristics. The method includes generating, by the system, a suggested cabling configuration for one or more applications based, at least in part, on the set of cable characteristics, the set of user selections, and the ranking, in which the one or more applications includes one or more of a design application, a manufacturing application, or a service application. The method includes outputting, by the system, the suggested cabling configuration to the user by at least providing a three-dimensional view of the suggested cabling configuration via the GUI.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
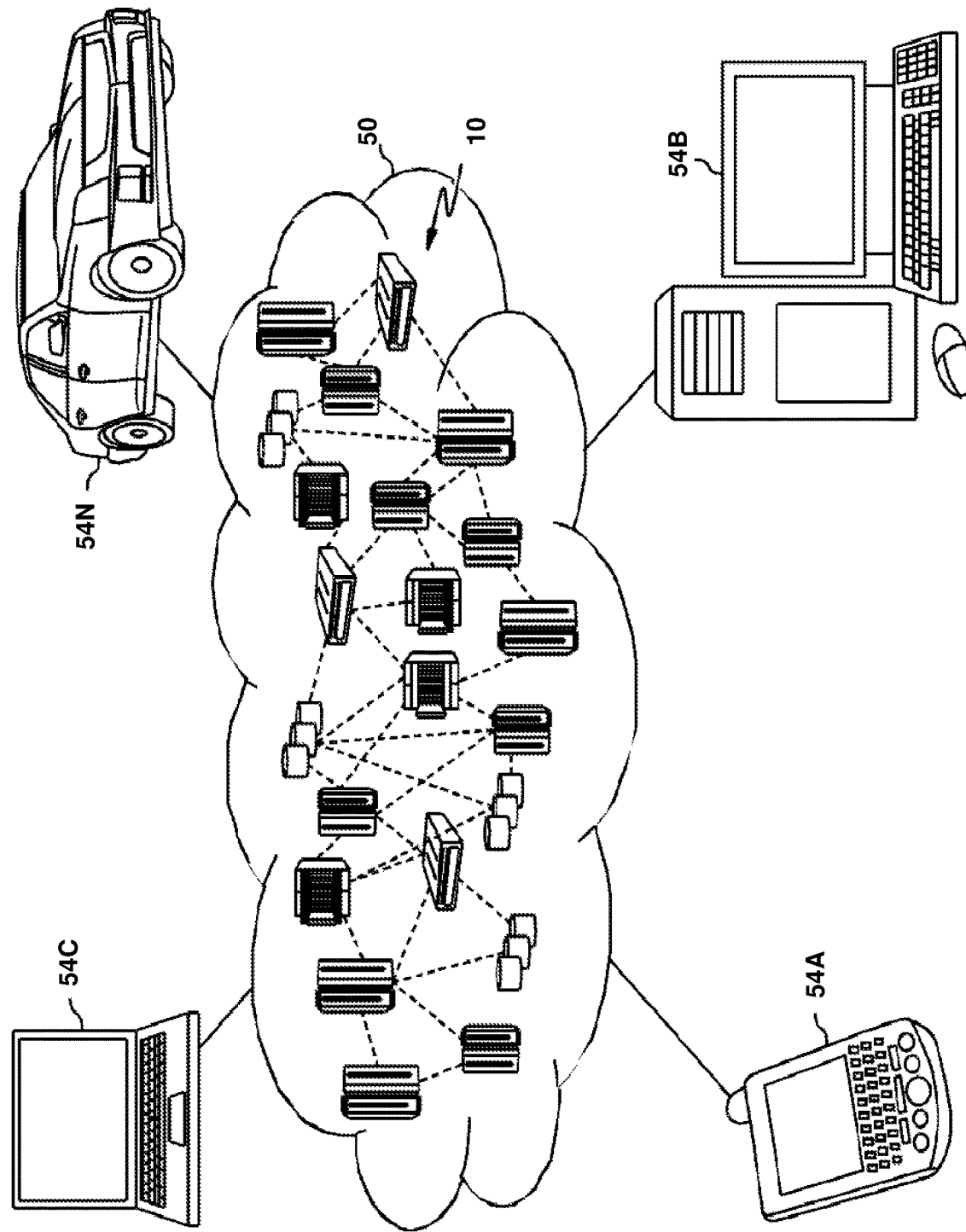
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
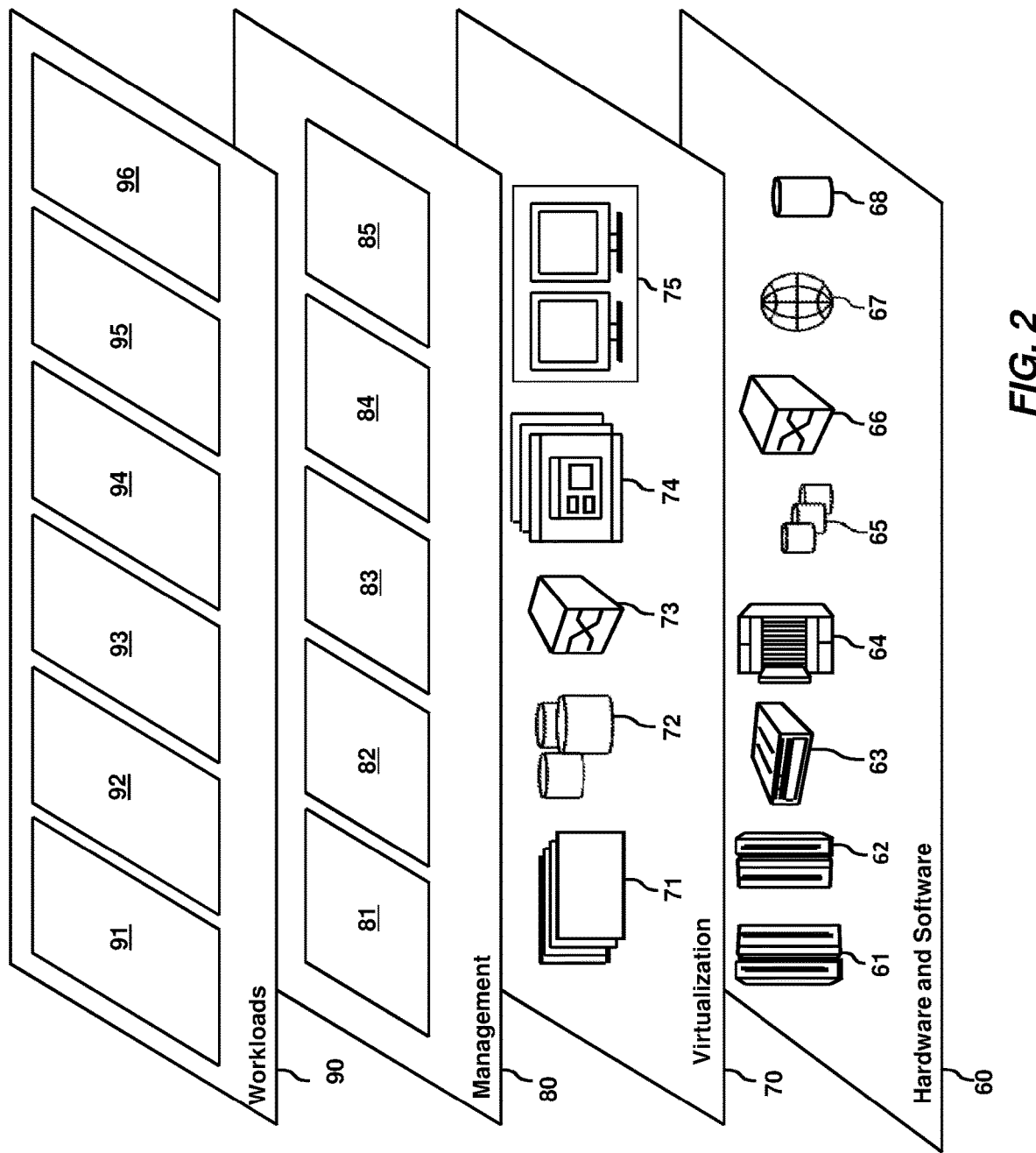
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cable routing optimization processing 96.

Turning now to an overview of technologies that are more specifically relevant to aspects of the invention, cabling configurations are becoming increasingly complex as a result of continuous expansion of technology, spacial limits of present datacenter footprints, and a growing desire to accommodate new technology within the same physical space. The increase in the number of highly customizable configurations and quantity of equipment that are needed to fit into the limited spacial footprint causes an ever growing number of possible cabling configurations, component placement options, and numerous potential upgrade paths. Presently available solutions lack the ability to optimize cable lengths and routing paths in a manner that efficiently accommodates all possible cabling configurations for the limited footprint space, and lack the ability to provide an interactive visual output which improves the serviceability and manufacturability of an end product.

Turning now to an overview of the aspects of the invention, one or more embodiments of the invention address the above-described shortcomings of the prior art by providing a system that incorporates an interactive three dimensional user interface that provides the user with the ability to select hardware building blocks, adapter options within those building blocks, and/or a desired footprint. The system allows the user to drag and drop these building blocks into desired locations of a physical hardware environment (e.g., a desired rack placement). The system provides feedback to the user by suggesting an optimal placement of these building blocks and/or suggestions of options for optimal cable selection and routing.

The above-described aspects of the invention address the shortcomings of the prior art by providing the ability to assign points in space of a grid system via dragging and dropping of entities, providing a three-dimensional view of optimal routing, and providing the ability to identify interference points, obstructions, and maximum capacities. In some embodiments of the present invention, an algorithm is provided that derives available space optimization, optimal installation sequence, and/or optimal uninstallation sequence for serviceability, which allows for the ability to influence the optimal placement of cages, drawers, switches, and/or other components based on cable optimization. The holographic output is able to enhance real-life applications of the solution by providing a three-dimensional and/or holographic visual aid that assists the user in implementing the suggested placement and routing.

Figure 3:
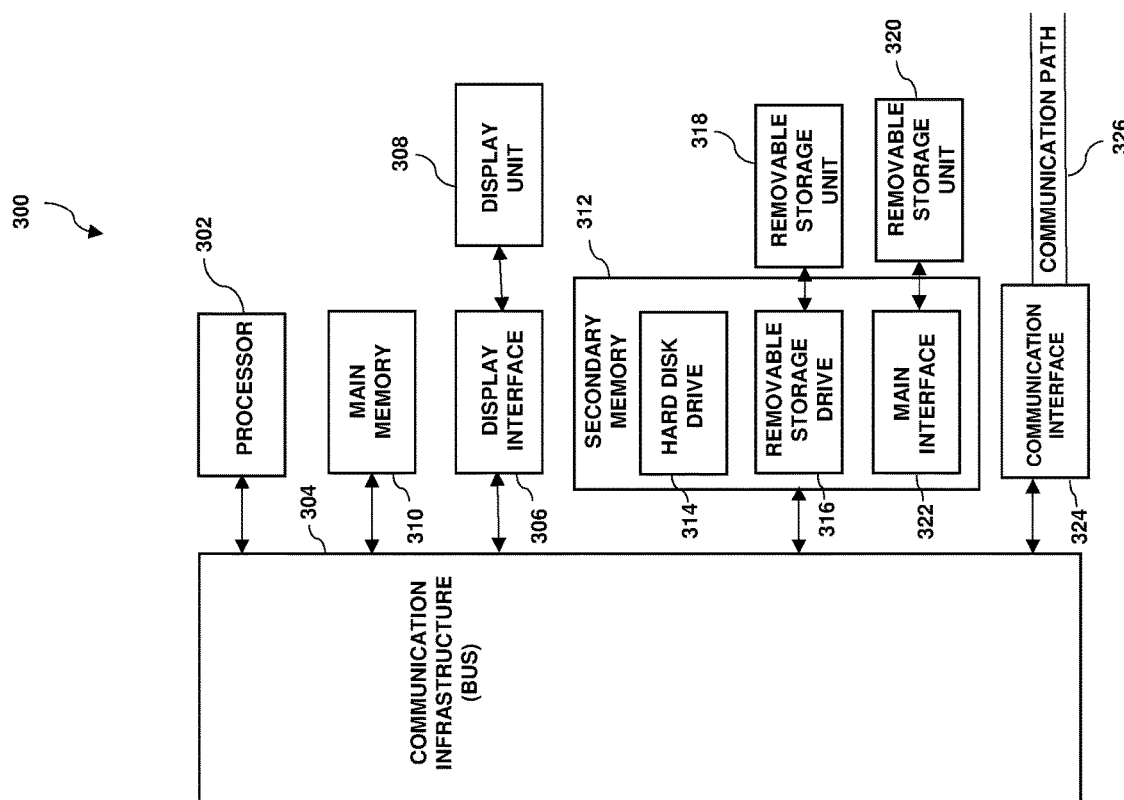
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random-access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
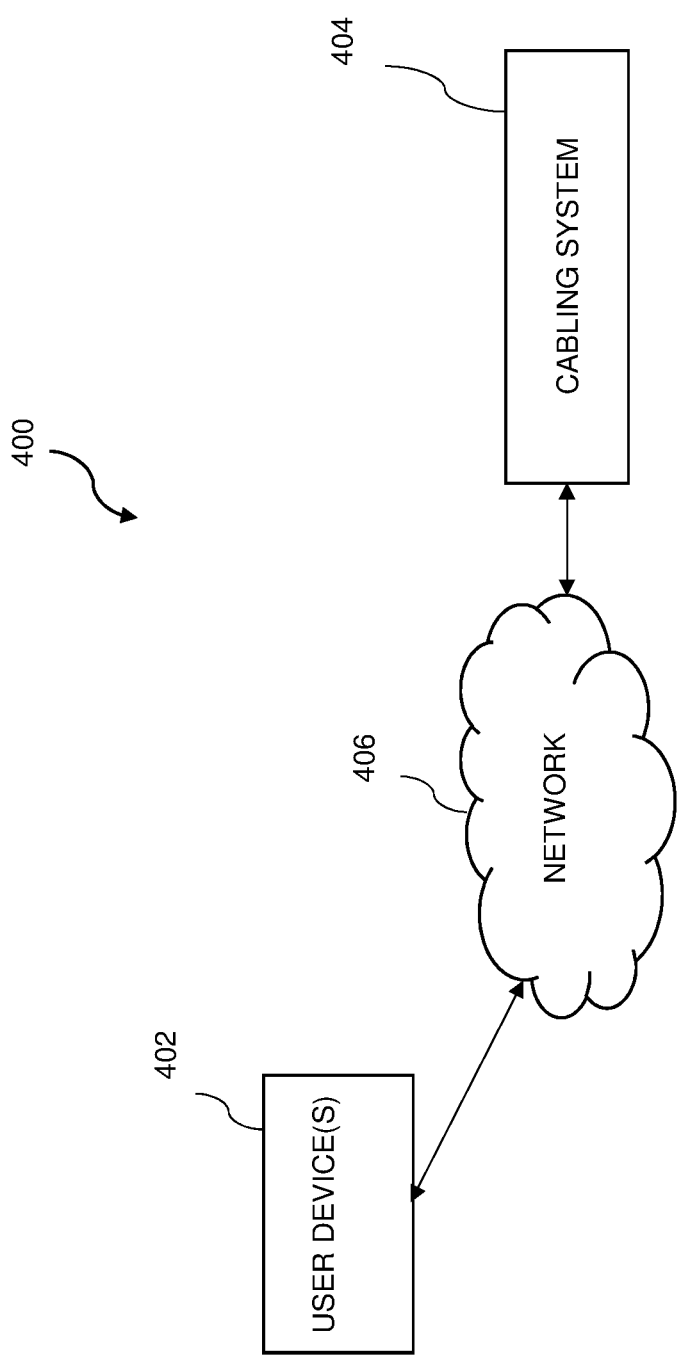
FIG. 4 depicts an exemplary distributed environment in accordance with one or more embodiments of the present invention.

Referring now to FIG. 4, an exemplary distributed environment 400 is presented for interactive cable routing and planning optimization for customized hardware configurations. Distributed environment 400 includes one or more user devices 402 and a cabling system 404, which are interconnected via network 406. FIG. 4 provides an illustration of only one example system and does not imply any limitations with regard to other systems in which different embodiments of the present invention may be implemented. Various suitable modifications to the depicted environment may be made, by those skilled in the art, without departing from the scope of the invention as recited by the claims.

In some embodiments of the present invention, cabling system 404 includes a machine learning component that can be utilized to solve a variety of technical issues (e.g., learning previously unknown functional relationships) in connection with technologies such as, but not limited to, machine learning technologies, video processing technologies, virtual reality technologies, data analytics technologies, data classification technologies, data clustering technologies, recommendation system technologies, signal processing technologies, and/or other digital technologies. Cabling system 404 employs hardware and/or software to solve problems that are highly technical in nature, that are not abstract and that cannot be performed as a set of mental acts by a human.

In certain embodiments of the invention, some or all of the processes performed by cabling system 404 are performed by one or more specialized computers for carrying out defined tasks related to machine learning. In some embodiments of the invention, cabling system 404 and/or components of the system are employed to solve new problems that arise through advancements in technologies mentioned above.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, cabling system 404 is a standalone computing device, a management server, a web server, a mobile computing device, or other suitable electronic device and/or computing system capable of receiving, sending, and processing data. In some embodiments of the present invention, cabling system 404 is a server computing system utilizing multiple computers, such as in cloud computing environment 50 (FIG. 1). In some embodiments of the present invention, cabling system 404 is a laptop computer, a tablet computer, a netbook computer, a personal computer (PC), a desktop computer, a personal digital assistant (PDA), a smart phone, or other suitable programmable electronic device capable of communicating with user device 402 and other computing devices (not shown) within distributed environment 400 via network 406. In some embodiments of the present invention, cabling system 404 is a computing system utilizing clustered computers and components (e.g., database server computers, application server computers, etc.) that act as a single pool of seamless resources that are accessible within distributed environment 400. Cabling system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, cabling system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information to and/or from cabling system 404. In some embodiments of the present invention, user device 402 is configured to present a GUI to a user that allows the user to provide an input via the dragging and dropping of entities. In some embodiments of the present invention, the GUI is presented to the user via a display device associated with user device 402. In some embodiments of the present invention, suggested cabling configurations that are provided by cabling system 404 (e.g., suggested placement and routing of cables) are caused to be displayed to the user via the GUI. In some embodiments of the present invention, user device 402 includes a holographic projector that is able to present the suggested configurations via a three-dimensional and/or holographic visual aid. For example, in some embodiments of the present invention, user device 402 is configured to present an image and/or video (e.g., standard video, immersive virtual reality video, etc.) via a display device such as a screen or wearable headgear, in which the video is generated and/or transmitted by cabling system 404. In some embodiments of the present invention, user device 402 is configured to gather user input data, biometric data, audible data, and/or visual data. For example, in some embodiments of the present invention, user device 402 includes one or more sensors for obtaining sensor data of the user, such as detecting head movement of the user, and/or tracking an eye gaze of the user. In some embodiments of the present invention, user device 402 is configured to capture audio, images, and/or video of the user (e.g., via a microphone and/or camera of user device 402). In some embodiments of the present invention, the three-dimensional projection is displayed to the user based on the detected head movement and/or tracked eye gaze of the user such that the user may be able to visualize the suggested configuration (e.g., suggested placement and routing of cables) within a real physical space (e.g., augmented reality).

In some embodiments of the present invention, user device 402 is a laptop computer, a tablet computer, a netbook computer, a personal computer (PC), a desktop computer, a personal digital assistant (PDA), a smart phone, an internet-of-things (IoT) enabled device, a VR/Augmented Reality (AR) display device, and/or other suitable programmable electronic devices capable of communicating with various components and devices within distributed environment 400. In some embodiments of the present invention, user device 402 comprises two or more separate devices. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

In general, cabling system 404 is a cognitive-based tool that is capable of providing cable routing and planning optimization for customized hardware configurations via an interactive GUI to determine a best possible cable routing and/or best possible hardware configuration for connecting a variety of cables to a hardware component (e.g., Ethernet cables, coaxial cables, USB cables, etc.). In general, cabling system 404 receives a set of cable characteristics and a set of user selections, in which the set of user selections are received via a graphical user interface (GUI), identifies possible cabling routes for a hardware configuration, ranks each of the possible cabling routes, generates a suggested cabling configuration for one or more applications, and outputs the suggested cabling configuration to the user via a three-dimensional view of the GUI and/or via a holographic visual aid.

In some embodiments of the present invention, cabling system 404 is configured to receive as inputs: a model of a system that is to be cabled (e.g. CAD model), a model of cable connectors (e.g., CAD model), and/or a set of cable characteristics (e.g., min bend radius, diameter, available lengths, cable costs, etc.). In some embodiments of the present invention, the receiving of the set of cable characteristics includes calculating values based on multi-variables such as, for example, a cost/quantity formula, a length/cost formula, and other suitable calculations. In some embodiments of the present invention, a set of user selections are obtained. In some embodiments of the present invention, the set of user selections includes a selection of ports to be connected at a component level and/or rules defining all acceptable port-to-port combinations to meet a connection requirement. In some embodiments of the present invention, the set of user selections further or alternatively includes component usable locations (e.g., an ASM file indicating slot location for certain hardware cards). In some embodiments of the present invention, the set of user selections further or alternatively includes an identification of system usable slots in a system frame (e.g., server rack). In some embodiments of the present invention, the set of user selections further or alternatively includes a prioritized list of optimization criteria (i.e., as referred to herein as "key metrics of interest"). In some embodiments of the present invention, cabling system 404 generates a suggested cabling configuration by, for example, calculating all possible cabled routes of a given hardware configuration, iterating through route generation rules, listing successful alternatives and/or error messages, ranking configurations based on prioritization and weighted key metrics, and identifying configurations from the rankings that meet a predefined threshold (e.g., configurations having cabling characteristics that meet predetermined threshold values such as having a certain cable radius, being of a certain type, etc.).

In some embodiments of the present invention, the calculating of the possible cabled routes of the given hardware confirmation includes calculation possible "from" and "to" location sets that meet each connection requirement (e.g., a set of start and termination locations). For example, in some embodiments of the present invention, starting criteria indicate to start with cables having the largest volume amount, cables having the least alternative "from" and "to" sets, and/or other suitable starting criteria. In some embodiments of the present invention, the calculating of the possible cable routes includes identifying high IO port density areas and ranking a route space based on density. (e.g., route density based on cross-sectional space of footprint).

In some embodiments of the present invention, cabling system 404 is configured to iterate the route generation rules by, for example, iterating linear paths in one dimension at a time, in which each path has a variable that is decreased by a variable amount at each time step (e.g., a "free route space" variable including a space buffer). Cabling system 404 is configured to output successful routes and rank metrics of interests. If an error is issued, the error may be outputted with an indication as to the cause of the error (e.g., error codes). Configuration is varied until success is reached and/or configurations are exhausted.

In some embodiments of the present invention, the ranking of the configurations includes outputting suggested optimal solutions based on weights and prioritization of the key metrics of interest. In some embodiments of the present invention, the ranking of the configurations based on key matrices includes outputting a list of strategic route space additions. In some embodiments of the present invention, cabling system 404 is configured to obtain feedback from the user, in which the user selects whether a provided solution has been accepted. In some embodiments of the present invention, the user may modify the set of input selections and request that the methodology be rerun. In some embodiments of the present invention, cabling system 404 is configured to update a trained machine learning model based on the received user feedback to improve the accuracy of generating future suggested configurations.

The following is an implementation of cabling system 404 that may be utilized in accordance with one or more embodiments of the present invention. In FIG. 4, cabling system 404 is configured to receive a first set of inputs. In some embodiments of the present invention, the first set of inputs includes one or more of (a) an available 3D routing space in structural frame, (b) cable characteristics, (c) cable origin location, (d) cable destination location, and/or (e) a minimum cable spacing. In some embodiments of the present invention, the cable characteristics include one or more cable types, cable sizes, bend radii of cables, diameters of cables, cross-sectional composition of cables, cross-sectional composition of insulators, and/or cross-sectional composition of bundled cables.

In some embodiments of the present invention, cabling system 404 is configured to generate a suggested cabling configuration for one or more applications. In some embodiments of the present invention, the one or more applications includes one or more of a design application, a manufacturing application, and/or a service application. In some embodiments of the present invention, the suggested cabling configuration is generated for the design, manufacturing, and/or service application based on an analysis process that includes analyzing an input CAD model of a design with plug start and termination locations, analyzing free available cabling space, and identifying allowable frame-to-frame transition points.

For example, in some embodiments of the present invention, when applying a design application, cabling system 404 is configured to receive a first set of cabling characteristics (i.e., a first set of key metrics of interest), in which the first set of cabling characteristics includes one or more of a configuration density, a thermal performance, a cable length, a distance between longest and shortest signal cable, and/or other suitable characteristics for hardware component that may be designed to have one or more cabling interfaces. In some embodiments of the present invention, the configuration density includes a density of input/output (I/O) cassettes per frame, system, drawer, or other structure of a hybrid system or a multi-frame system design.

In some embodiments of the present invention, when applying the design application, cabling system 404 is configured to execute a design analysis process that includes analyzing the first set of characteristics to identify characteristics for optimal product offering and/or configuration of design of a hardware component such that the production of the design has a minimal risk of being delayed due to the impact of cabling complications of the hardware component. The design analysis process allows for cabling feasibility analysis to be performed during the conceptual design of a hardware component, which may be a limiting factor in hybrid system configurations and/or multi-frame system configurations. In some embodiments of the present invention the design analysis process includes receiving a first design hardware configuration as input and ascertaining whether the input design can be cabled. Upon determining that the hardware configuration can be cabled, possible cabling configuration of the hardware configuration are identified. The identified cabling configurations are analyzed based on the first set of characteristics.

In some embodiments of the present invention, in response to analyzing the first set of characteristics, a set of suggested design alterations are outputted by cabling system 404. In some embodiments of the present invention, the set of suggested design alterations is generated based on selectively, interactively optimizing the first set of characteristics. For example, in some embodiments of the present invention, cabling system 404 is configured to output a set of suggested design alterations that includes a connector location on IO cards, and/or other suitable subcomponent alterations. In some embodiments of the present invention, in addition or in alternative to outputting the set of suggested design alterations, cabling system 404 is configured to generate and output a set of suggested assembly configuration alterations. In some embodiments of the present invention, the set of suggested design alterations is generated by selectively optimizing metrics of interest by maximizing one characteristic of the first set of characteristics and/or maximizing a combination of one or more characteristics of the first set of characteristics. For example, in some embodiments of the present invention, cabling system 404 is configured to output a set of suggested assembly configuration alterations that includes a location of a drawer (e.g., server rack) and one or more locations of card plugs within the drawer.

In some embodiments of the present invention, upon determining that the hardware configuration is not presently capable of being cabled, cabling system 404 is configured to generate a set of design and/or configuration changes that allow cabling and critical service applications to be performed. In some embodiments of the present invention, the set of design and/or configuration changes are generated based on iteratively removing lowest ranked metric(s) from the analyzed possible configurations until cabling is achievable. In some embodiments of the present invention, the configuration changes serve as a starting point for design alterations. The design analysis process is then rerun using the set starting point.

In some embodiments of the present invention, when applying the manufacturing application, cabling system 404 is configured to receive a second set of cabling characteristics (e.g., a second set of key metrics), in which the second set of cabling characteristics includes one or more of unique part numbers, cabling/un-cabling times, ergonomic metrics, risk of assembly induced damage, cabling configurations that are available based on limited part availability, and/or other suitable characteristics for the manufacturing of a system component. In some embodiments of the present invention, the risk of assembly induced damage includes metrics related to the amount of fragility associated with cables that were previously installed. In some embodiments of the present invention, the configuration cabling includes configuration and cabling of an inventory management and forecasting system.

In some embodiments of the present invention, when applying the service application, cabling system 404 is configured to receive a third set of cabling characteristics (e.g., a third set of key metrics, in which the third set of cabling characteristics includes one or more of a cabling/un-cabling time, complexity of likely field upgrade, ease of service, and/or other suitable characteristics related to servicing and/or updating hardware components when substituting or adding hardware to a system (e.g., a multi-frame system design). In some embodiments of the present invention, the cabling/un-cabling time are each an estimate of how long a certain hardware component would take to be cabled and/or un-cabled in the field. In some embodiments of the present invention, the complexity of a likely field upgrade of service is based on a risked-based ranking. In some embodiments of the present invention, the risk-based ranking includes a likelihood of a service requirement occurring, in which the likelihood is based on field failure data that is obtained in real-time.

In regards to the manufacturing and service applications, in some embodiments of the present invention, when applying the manufacturing and/or service application, cabling system 404 is configured to execute a manufacturing and/or service analysis process that includes analyzing the second and/or third set of characteristics to identify optimal manufacturing or field service characteristics that result in minimal risk of field cabling complications. Previously, field configurations relied heavily on technician experience and time consuming standardized "cookie cutter" instructions. In contrast, the manufacturing and/or service process that are performable by cabling system 404 may serve as on-demand optimized cable configurator that is based on per-case customizable requirements. The configuration acts as an engine for virtual cable instructions, which may be presented in a three-dimensional GUI and/or holographic projection (e.g., via user device 402).

In regards to the manufacturing and/or service process, in some embodiments of the present invention, given a desired system configuration and/or a predetermined pre-cabled system hardware confirmation in a field, cabling system 404 is configured to make a determination as to whether additional systems and/or systems components are desired to be cabled. Upon determining that additional system and/or system components are desired to be cabled, cabling system 404 is configured to analyze the possible cabling configurations of the hardware configuration in view of the second and/or third set of characteristics. For example, in some embodiments of the present invention, in response to analyzing the second and/or third set of characteristics, cabling system 404 is configured to generate and output a set of suggested assembly alterations. In some embodiments of the present invention, the set of suggested assembly alterations is generated based on selectively optimizing metrics of interest such as by maximizing at least one characteristic of the second and/or third set of characteristics and/or maximizing a combination of one or more characteristics of the second and/or third set of characteristics. In some embodiments of the present invention, a suggested order of assembly and/or disassembly is outputted by cabling system 404 based on an amount of risk that is associated with the second and/or third set of characteristics.

In some embodiments of the present invention, upon determining that additional system and/or system components are not desired to be cabled, cabling system 404 is configured to generate and output a suggested set of configuration to a user to allow cabling and critical service applications to be performed. In some embodiments of the present invention, the set configuration changes are generated based on iteratively removing lowest ranked metric(s) from the analyzed possible configurations until cabling is achievable. In some embodiments of the present invention, the configuration serves as a starting point for design alterations. The manufacturing and/or service analysis process is then rerun using the set starting point.

Figure 5:
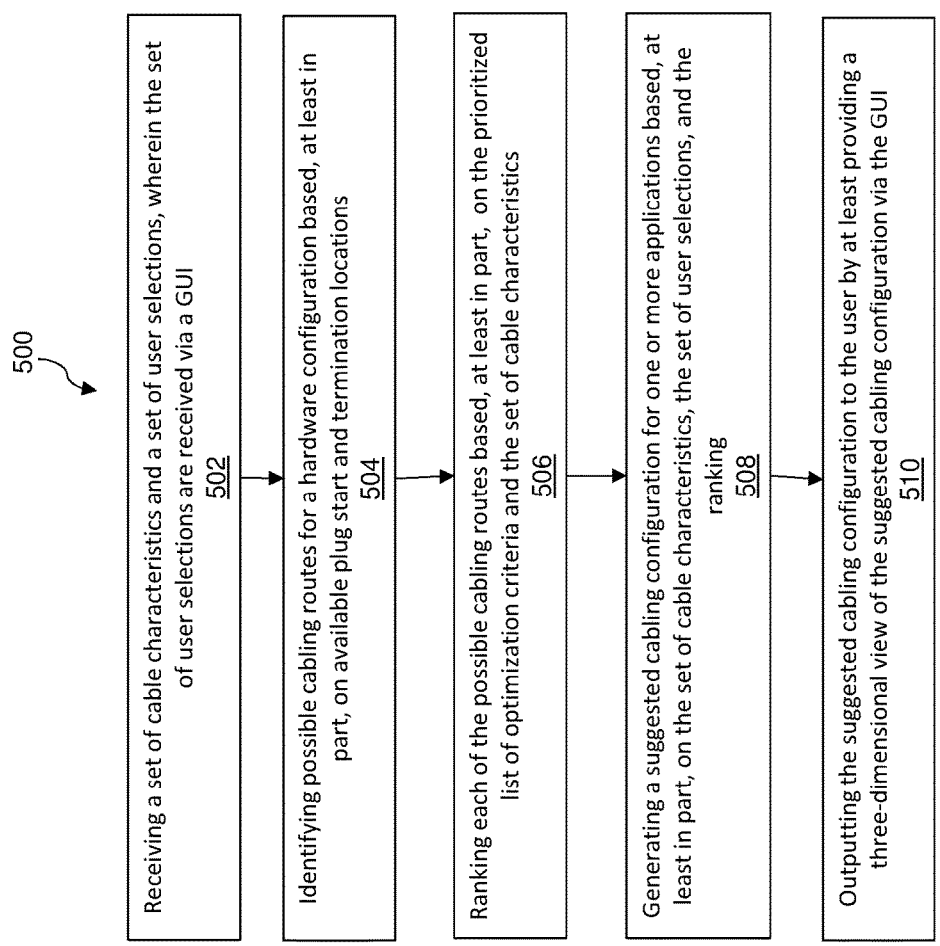
FIG. 5 depicts a flow diagram illustrating a methodology in accordance with one or more embodiments of the present invention.

Additional details of the operation of system 404 will now be described with reference to FIG. 5, wherein FIG. 5 depicts a flow diagram illustrating a methodology 500 according to one or more embodiments of the present invention. At block 502, a set of cable characteristics and a set of user selections are received (e.g., via cabling system 404 of FIG. 4). In some embodiments of the present invention, the set of user selections and/or the set of cabling characteristics are received via a graphical user interface (GUI) (e.g., via a GUI of user device 402 of FIG. 4). In some embodiments of the present invention, the set of user selections includes a prioritized list of optimization criteria. At block 504, possible cabling routes for a hardware configuration are identified (e.g., via cabling system 404 of FIG. 4). In some embodiments of the present invention, the possible cabling routes are identified based, at least in part, on available plug start and termination locations. At block 506, each of the possible cabling routes are ranked (e.g., via cabling system 404 of FIG. 4). In some embodiments of the present invention, the possible cabling routes are ranked based, at least in part, on the prioritized list of optimization criteria and/or the set of cable characteristics. At block 508 a suggested cabling configuration is generated for one or more applications (e.g., via cabling system 404 of FIG. 4). In some embodiments of the present invention, the suggested cabling configuration is generated based, at least in part, on the set of cable characteristics, the set of user selections, and/or the ranking. At block 510, the suggested cabling configuration is outputted to the user (e.g., from cabling system 404 to user device 402). In some embodiments of the present invention, the suggested cabling configuration is outputted to the user via a three-dimensional view that is presented by the GUI (e.g., via a GUI of user device 402 of FIG. 4). In some embodiments of the present invention, the three-dimensional view is presented by projecting a three-domination representation on a physical environment via, for example, an augmented reality technique. In some embodiments of the present invention, the outputting of the cabling configuration includes displaying a holographic visual aide.

In some embodiments of the present invention, the set of user selections are received by the system in response to receiving a dragging and dropping input from the user. In some embodiments of the present invention, the dragging and dropping input includes arranging hardware components or cables within the GUI, wherein the outputting of the cabling configuration includes displaying a holographic visual aide.

In some embodiments of the present invention, the one or more applications includes the design application, in which the set of cable characteristics includes one or more of a configuration density, a thermal performance, a cable length, or distance between longest and shortest signal cable. In some embodiments of the present invention, the generating of the suggested cabling configuration includes generating a set of suggested design alterations, in which the set of suggested design alterations includes a change in a connector location of the hardware configuration. In some embodiments of the present invention, the set of suggested design alterations further includes a set of suggested assembly configuration alterations, in which the set of suggested assembly configuration alterations includes a location of a drawer and locations of card plugs within the drawer.

In some embodiments of the present invention, the one or more applications includes the manufacturing application, in which the set of cable characteristics includes one or more of unique part numbers, cabling/un-cabling times, ergonomic metrics, risk of assembly induced damage, and/or cabling configurations that are available based on limited part availability. In some embodiments of the present invention, the risk of assembly induced damages includes metrics relating to an amount of fragility of previously installed cables.

In some embodiments of the present invention, the one or more applications includes the service application, in which the set of cable characteristics includes one or more of cabling/un-cabling times, complexity of likely field upgrades, and/or ease of service related to servicing or updating hardware components when substituting or adding hardware of a multi-frame system. In some embodiments of the present invention, the generating of the suggested cabling configuration includes generating a set of suggested assembly alterations, in which the set of suggested assembly alterations are based, at least in part, on maximizing a metric of the set of cabling characteristics or maximizing a combination of metrics of the set of cabling characteristics.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for interactive cable configuration routing, the computer-implemented method comprising:

receiving, by a system comprising one or more processors, a set of cable characteristics and a set of user selections, wherein the set of user selections are received via a graphical user interface (GUI), and wherein the set of user selections includes a prioritized list of optimization criteria;

identifying, by the system, possible cabling routes for a hardware configuration based, at least in part, on available three-dimensional (3D) routing space in a structural frame, and available plug start and termination locations;

ranking, by the system, each of the possible cabling routes based, at least in part, on the prioritized list of optimization criteria and the set of cable characteristics;

generating, by the system, a suggested cabling configuration for one or more applications based, at least in part, on the set of cable characteristics, the set of user selections, and the ranking, wherein the one or more applications includes one or more of a design application, a manufacturing application, or a service application; and outputting, by the system, the suggested cabling configuration to the user by at least providing a three-dimensional view of the suggested cabling configuration via the GUI, wherein:

the one or more applications includes the service application, and the set of cable characteristics includes cabling/un-cabling times, each cabling/un-cabling time comprising an estimate of how long a hardware component would take to be cabled and/or un-cabled.

2. The computer-implemented method of claim 1, wherein the one or more applications further includes the design application, wherein the set of cable characteristics further includes one or more of a configuration density, a thermal performance, a cable length, or distance between longest and shortest signal cable, wherein the generating of the suggested cabling configuration includes generating a set of suggested design alterations, wherein the set of suggested design alterations includes a change in a connector location of the hardware configuration.

3. The computer-implemented method of claim 2, wherein the set of suggested design alterations further includes a set of suggested assembly configuration alterations, wherein the set of suggested assembly configuration alterations includes a location of a drawer and locations of card plugs within the drawer.

4. The computer-implemented method of claim 1, wherein the one or more applications further includes the manufacturing application, wherein the set of cable characteristics further includes one or more of unique part numbers, cabling/un-cabling times, ergonomic metrics, risk of assembly induced damage, cabling configurations that are available based on limited part availability, wherein the risk of assembly induced damages includes metrics relating to an amount of fragility of previously installed cables.

5. The computer-implemented method of claim 1, wherein the set of cable characteristics further includes one or both of complexity of likely field upgrades, and ease of service related to servicing or updating hardware components when substituting or adding hardware of a multi-frame system.

6. The computer-implemented method of claim 1, wherein the generating of the suggested cabling configuration includes generating a set of suggested assembly alterations, wherein the set of suggested assembly alterations are based, at least in part, on maximizing at least one metric of the set of cabling characteristics or maximizing a combination of metrics of the set of cabling characteristics.

7. The computer-implemented method of claim 1, wherein the set of user selections are received by the system in response to receiving a dragging and dropping input from the user, wherein the dragging and dropping input includes arranging hardware components or cables within the GUI, wherein the outputting of the cabling configuration includes displaying a holographic visual aide.

8. A system for interactive cable configuration routing, the system comprising one or more processors configured to perform a method comprising:
receiving, by the system, a set of cable characteristics and a set of user selections, wherein the set of user selections are received via a graphical user interface (GUI), wherein the set of user selections includes a prioritized list of optimization criteria;
identifying, by the system, possible cabling routes for a hardware configuration based, at least in part, on available three-dimensional (3D) routing space in a structural frame, and available plug start and termination locations;
ranking, by the system, each of the possible cabling routes based, at least in part, on the prioritized list of optimization criteria and the set of cable characteristics;
generating, by the system, a suggested cabling configuration for one or more applications based, at least in part, on the set of cable characteristics, the set of user selections, and the ranking, wherein the one or more applications includes one or more of a design application, a manufacturing application, or a service application; and
outputting, by the system, the suggested cabling configuration to the user by at least providing a three-dimensional view of the suggested cabling configuration via the GUI, wherein:
the one or more applications includes the service application, and
the set of cable characteristics includes cabling/un-cabling times, each cabling/un-cabling time comprising an estimate of how long a hardware component would take to be cabled and/or un-cabled.

9. The system of claim 8, wherein the one or more applications further includes the design application, wherein the set of cable characteristics further includes one or more of a configuration density, a thermal performance, a cable length, or distance between longest and shortest signal cable, wherein the generating of the suggested cabling configuration includes generating a set of suggested design alterations, wherein the set of suggested design alterations includes a change in a connector location of the hardware configuration.

10. The system of claim 9, wherein the set of suggested design alterations further includes a set of suggested assembly configuration alterations, wherein the set of suggested assembly configuration alterations includes a location of a drawer and locations of card plugs within the drawer.

11. The system of claim 8, wherein the one or more applications further includes the manufacturing application, wherein the set of cable characteristics further includes one or more of unique part numbers, cabling/un-cabling times, ergonomic metrics, risk of assembly induced damage, cabling configurations that are available based on limited part availability, wherein the risk of assembly induced damages includes metrics relating to an amount of fragility of previously installed cables.

12. The system of claim 8, wherein the set of cable characteristics further includes one or both of complexity of likely field upgrades, and ease of service related to servicing or updating hardware components when substituting or adding hardware of a multi-frame system.

13. The system of claim 8, wherein the generating of the suggested cabling configuration includes generating a set of suggested assembly alterations, wherein the set of suggested assembly alterations are based, at least in part, on maximizing at least one metric of the set of cabling characteristics or maximizing a combination of metrics of the set of cabling characteristics.

14. The system of claim 8, wherein the set of user selections are received by the system in response to receiving a dragging and dropping input from the user, wherein the dragging and dropping input includes arranging hardware components or cables within the GUI, wherein the outputting of the cabling configuration includes displaying a holographic visual aide.

15. A computer program product for interactive cable configuration routing, the computer program product comprising a computer readable storage medium having program instructions embodied therewith, the program instructions executable by a system comprising one or more processors to cause the system to perform a method comprising:
receiving, by the system, a set of cable characteristics and a set of user selections, wherein the set of user selections are received via a graphical user interface (GUI), wherein the set of user selections includes a prioritized list of optimization criteria;

identifying, by the system, possible cabling routes for a hardware configuration based, at least in part, on available three-dimensional (3D) routing space in a structural frame, and available plug start and termination locations;

ranking, by the system, each of the possible cabling routes based, at least in part, on the prioritized list of optimization criteria and the set of cable characteristics;

generating, by the system, a suggested cabling configuration for one or more applications based, at least in part, on the set of cable characteristics, the set of user selections, and the ranking, wherein the one or more applications includes one or more of a design application, a manufacturing application, or a service application; and outputting, by the system, the suggested cabling configuration to the user by at least providing a three-dimensional view of the suggested cabling configuration via the GUI, wherein:

the one or more applications includes the service application, and the set of cable characteristics includes cabling/un-cabling times, each cabling/un-cabling time comprising an estimate of how long a hardware component would take to be cabled and/or un-cabled.

16. The computer program product of claim 15, wherein the one or more applications further includes the design application, wherein the set of cable characteristics further includes one or more of a configuration density, a thermal performance, a cable length, or distance between longest and shortest signal cable, wherein the generating of the suggested cabling configuration includes generating a set of suggested design alterations, wherein the set of suggested design alterations includes a change in a connector location of the hardware configuration.

17. The computer program product of claim 16, wherein the set of suggested design alterations further includes a set of suggested assembly configuration alterations, wherein the set of suggested assembly configuration alterations includes a location of a drawer and locations of card plugs within the drawer.

18. The computer program product of claim 15, wherein the one or more applications further includes the manufacturing application, wherein the set of cable characteristics further includes one or more of unique part numbers, cabling/un-cabling times, ergonomic metrics, risk of assembly induced damage, cabling configurations that are available based on limited part availability, wherein the risk of assembly induced damages includes metrics relating to an amount of fragility of previously installed cables.

19. The computer program product of claim 15, wherein the set of cable characteristics further includes one or both of complexity of likely field upgrades, and ease of service related to servicing or updating of hardware components when substituting or adding hardware of a multi-frame system.

20. The computer program product of claim 15, wherein the generating of the suggested cabling configuration includes generating a set of suggested assembly alterations, wherein the set of suggested assembly alterations are based, at least in part, on maximizing at least one metric of the set of cabling characteristics or maximizing a combination of metrics of the set of cabling characteristics.

* * * * *